(12) United States Patent
Wallius et al.

(10) Patent No.: US 9,182,652 B2
(45) Date of Patent: Nov. 10, 2015

(54) FLASHLAMP APPARATUS AND METHOD

(71) Applicant: Nokia Corporation, Espoo (FI)

(72) Inventors: Samuli U. Wallius, Turku (FI); Mikko Antton Juhola, Muurla (FI); Lassi Kristian Yla-Soininmaki, Hameenlinna (FI); Tomi Juhani Lintulahti, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 92 days.

(21) Appl. No.: 13/920,293

(22) Filed: Jun. 18, 2013

(65) Prior Publication Data

US 2014/0368730 A1 Dec. 18, 2014

(51) Int. Cl.
*H04N 5/235* (2006.01)
*H04N 5/225* (2006.01)
*G03B 15/06* (2006.01)

(52) U.S. Cl.
CPC ............... *G03B 15/06* (2013.01); *H04N 5/2252* (2013.01); *H04N 5/2256* (2013.01); *H04N 5/2354* (2013.01); *G03B 2215/0525* (2013.01); *G03B 2215/0532* (2013.01); *G03B 2215/0589* (2013.01); *Y10T 29/49826* (2015.01)

(58) Field of Classification Search
CPC ............... H04N 5/2354; H04N 5/2251
USPC ............... 348/371, 373, 374; 362/2; 313/234
See application file for complete search history.

(56) References Cited

U.S. PATENT DOCUMENTS

| | | | | |
|---|---|---|---|---|
| 5,884,104 | A * | 3/1999 | Chase et al. | 396/6 |
| 6,850,375 | B2 * | 2/2005 | Tenmyo | 359/831 |
| 7,589,785 | B2 * | 9/2009 | Kobayashi | 348/371 |
| 2010/0118178 | A1* | 5/2010 | Wang et al. | 348/371 |
| 2012/0176059 | A1* | 7/2012 | Ogino et al. | 315/224 |
| 2013/0163768 | A1* | 6/2013 | Salter et al. | 381/56 |
| 2013/0222682 | A1* | 8/2013 | Yoshioka et al. | 348/371 |
| 2013/0241388 | A1* | 9/2013 | Nomoto | 313/234 |
| 2014/0167596 | A1* | 6/2014 | Sakamoto | 313/234 |

* cited by examiner

*Primary Examiner* — James Hannett
(74) *Attorney, Agent, or Firm* — Harrington & Smith

(57) ABSTRACT

An apparatus including a flashlamp; a lens member connected to the flashlamp; and a reflector connected to the lens member. The lens member is located between the flashlamp and the reflector. A method includes connecting the lens member to the flashlamp, where the lens member substantially surrounds the flashlamp, and connecting the reflector around an exterior side of the lens member, where an exit side of the lens member is not covered by the reflector.

19 Claims, 6 Drawing Sheets

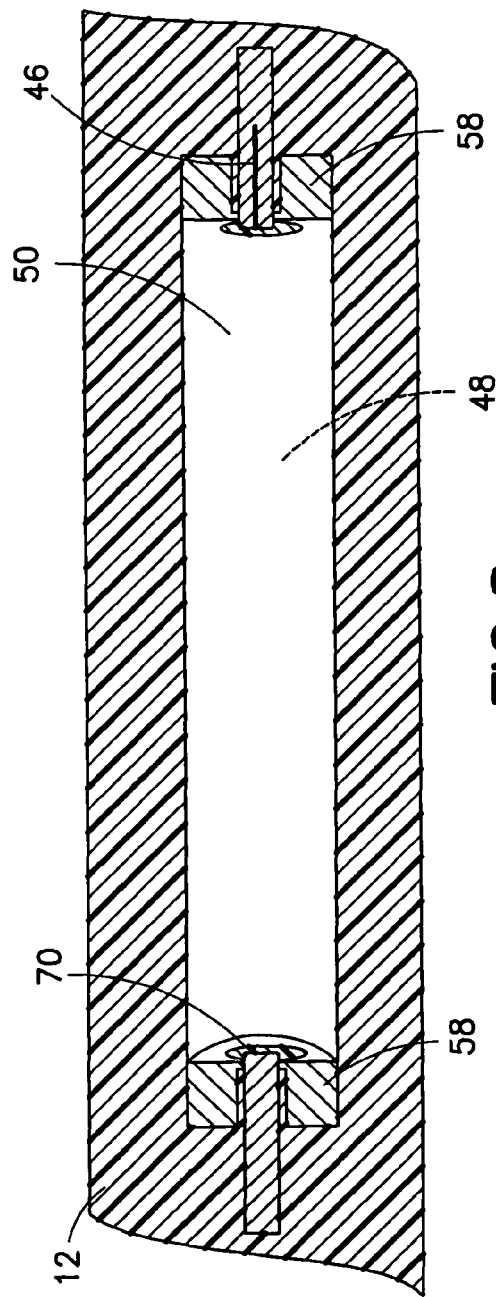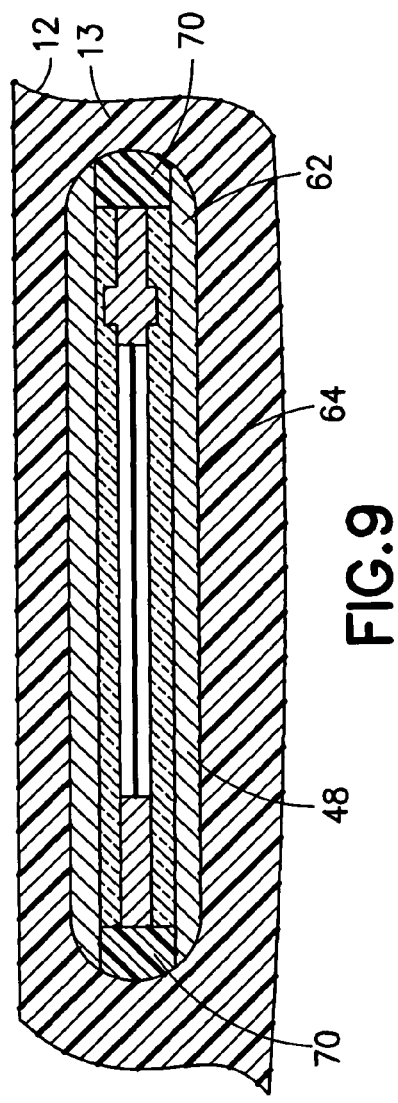

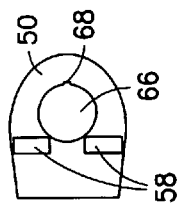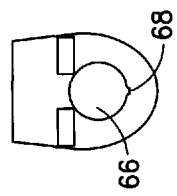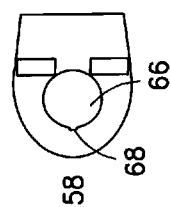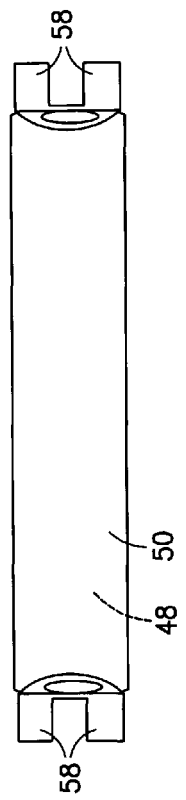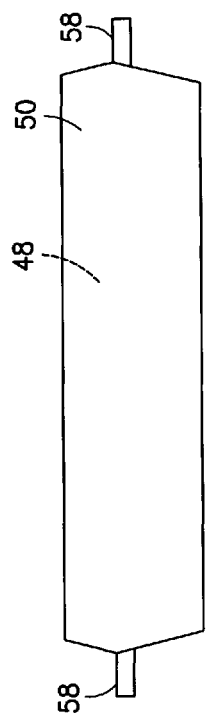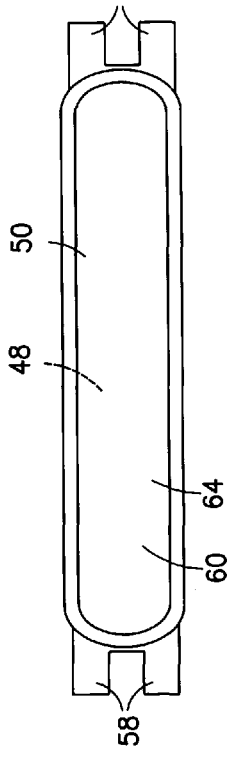

FLASHLAMP APPARATUS AND METHOD

BACKGROUND

1. Technical Field

The exemplary and non-limiting embodiments relate generally to a flashlamp and, more particularly, to an apparatus having a flashlamp.

2. Brief Description of Prior Developments

A flashtube, also called a flashlamp, is an electric arc lamp designed to produce extremely intense, incoherent, full-spectrum white light for very short durations. Flashtubes are made of a length of glass tubing with electrodes at either end. The tubing is filled with a gas which, when triggered, ionizes and conducts a high voltage pulse to produce the light. Flashtubes are used mostly for photographic purposes, but are also employed in scientific, medical and industrial applications.

SUMMARY

The following summary is merely intended to be exemplary. The summary is not intended to limit the scope of the claims.

In accordance with one aspect, an example embodiment is provided in an apparatus comprising a flashlamp; a lens member connected to the flashlamp; and a reflector connected to the lens member. The lens member is located between the flashlamp and the reflector.

In accordance with another aspect, an example method comprises generating light from a flashlamp; the light from the flashlamp traveling through a lens member before being reflected by a reflector, where the lens member substantially surrounds the flashlamp; and the light, after being reflected by the reflector, traveling through the lens member again and out an exit side of the lens member.

In accordance with another aspect, an example method comprises connecting a lens member to a flashlamp, where the lens member substantially surrounds the flashlamp, and connecting a reflector around an exterior side of the lens member, where an exit side of the lens member is not covered by the reflector.

In accordance with another aspect, an example embodiment is provided in an apparatus comprising a flashlamp which includes electrodes; and a reflector stationarily attached to the flashlamp by a transparent reflector carrier directly between the flashlamp and the reflector. The transparent reflector carrier spaces the reflector from the flashlamp such that the reflector is separated from the electrodes.

BRIEF DESCRIPTION OF THE DRAWINGS

The foregoing aspects and other features are explained in the following description, taken in connection with the accompanying drawings, wherein:

FIG. 8 is a schematic rear view of the flashlamp assembly shown in FIGS. 5-6;

FIG. 9 is a schematic front view of the flashlamp assembly shown in FIGS. 5-6;

FIG. 10A is a rear view of the lens member with integral reflector shown in FIGS. 5-6 and 8-9;

FIG. 10B is a side view of the lens member with integral reflector shown in FIG. 10A;

FIG. 11A is a top view of the lens member with integral reflector shown in FIG. 10A;

FIG. 11B is a side view of the lens member with integral reflector shown in FIG. 11A;

FIG. 12A is a front view of the lens member with integral reflector shown in FIG. 10A;

FIG. 12B is a side view of the lens member with integral reflector shown in FIG. 12A.

DETAILED DESCRIPTION OF EMBODIMENTS

Figure 1:
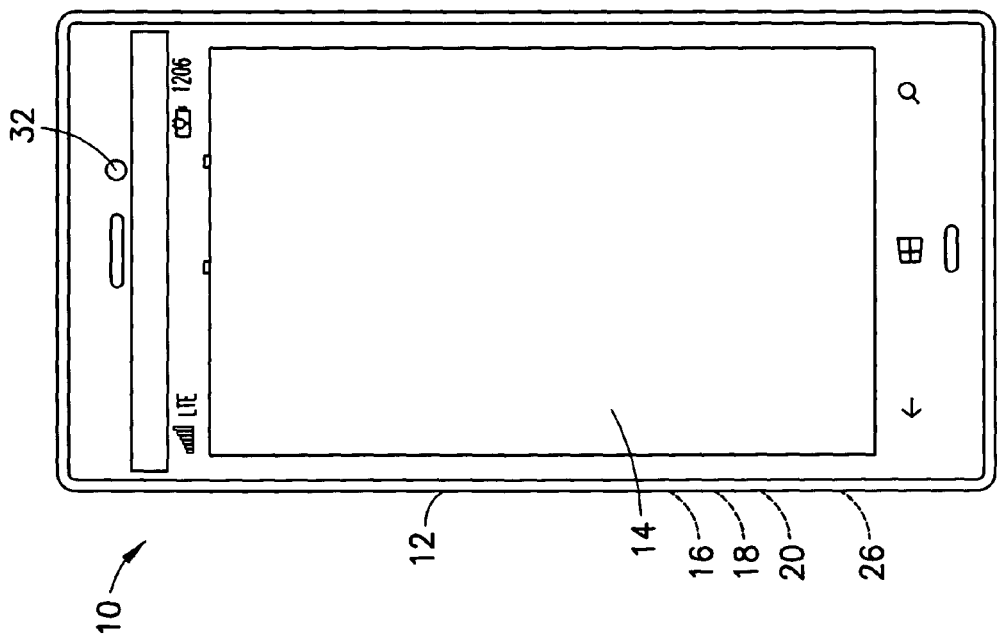
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone. For example, the apparatus might be a camera.

Figure 2:
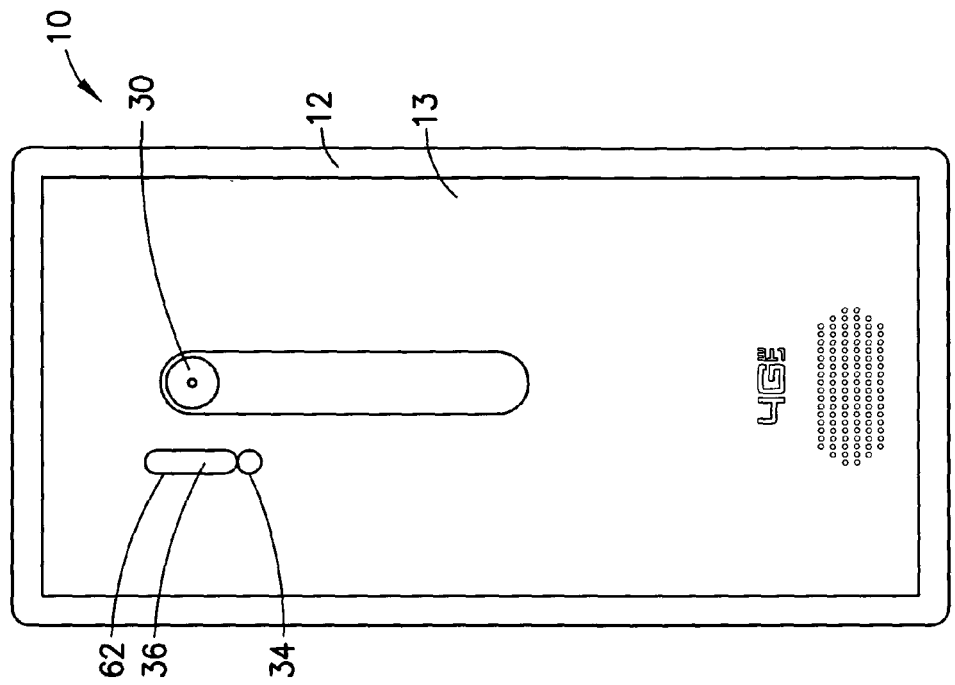
FIG. 2 is a rear view of the apparatus shown in FIG. 1.
Figure 3:
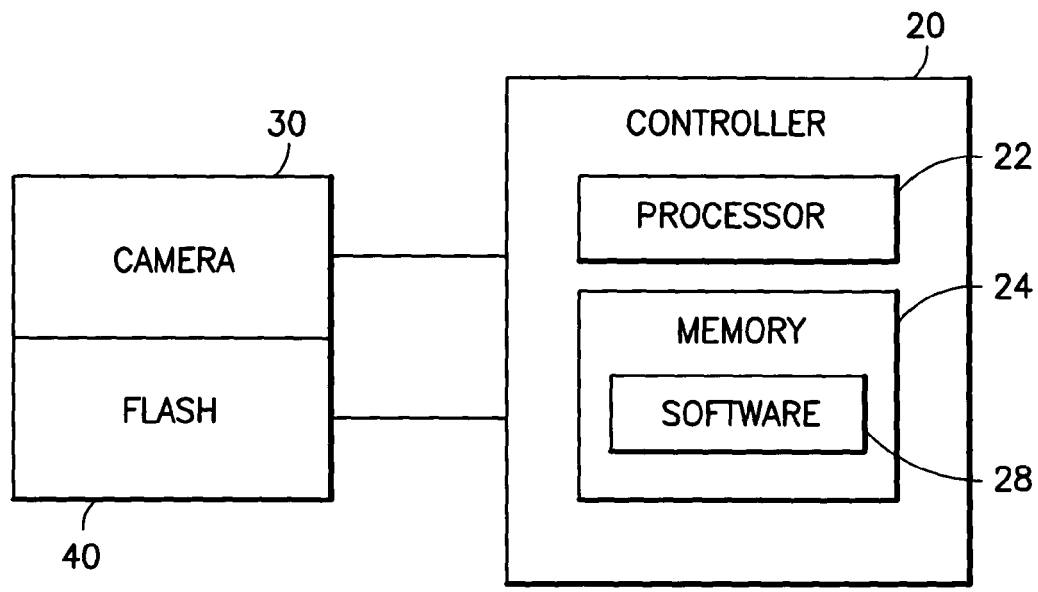
FIG. 3 is a diagram illustrating some of the components of the apparatus shown in FIGS. 1-2.

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) having components such as the controller 20 thereon. The receiver 16 and transmitter form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED and the flash system 36 are connected to the controller 20 such that the controller may control their operation.

Figure 4:
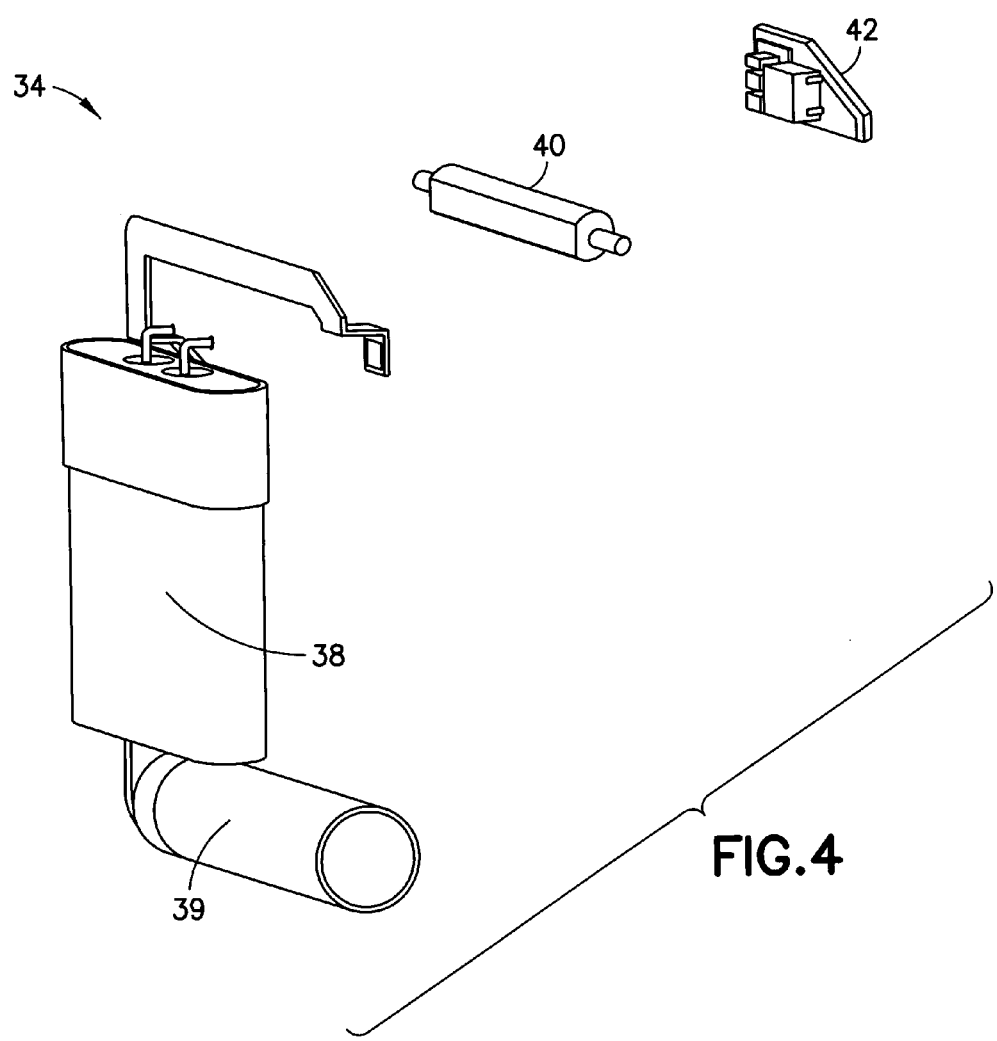
FIG. 4 is an exploded view of some of the components of the apparatus shown in FIGS. 1-2.
Figure 5:
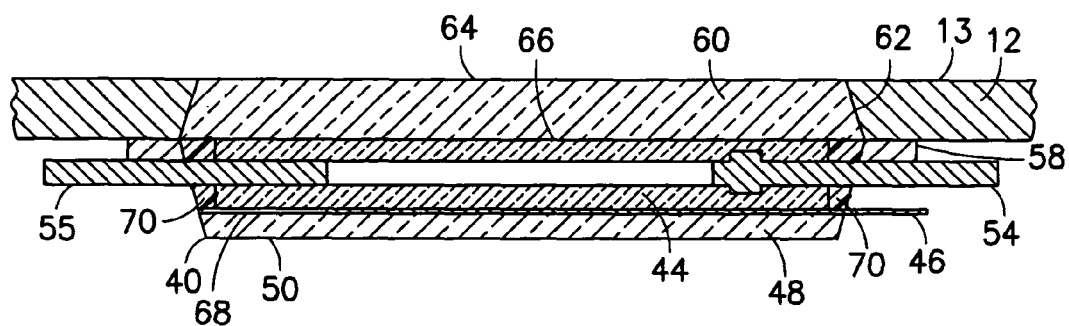
FIG. 5 is a schematic sectional view of the flashlamp assembly shown in FIG. 2.
Figure 6:
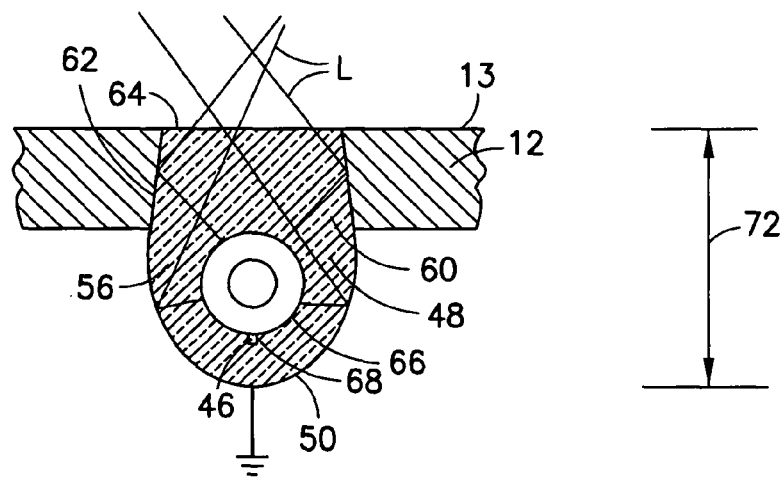
FIG. 6 is a schematic sectional view of the flashlamp assembly shown in FIG. 5.

Referring also to FIG. 4, the flash system 34 in this example comprises capacitors 38, 39, a flashlamp apparatus 40 and a portion of the controller 20 comprising a printed wiring board 42. Referring also to FIGS. 5-12B, in this example embodiment the flashlamp apparatus 40 comprises a flashlamp 44, a trigger electrode 46, a lens member 48 and a reflector 50.

Figure 7:
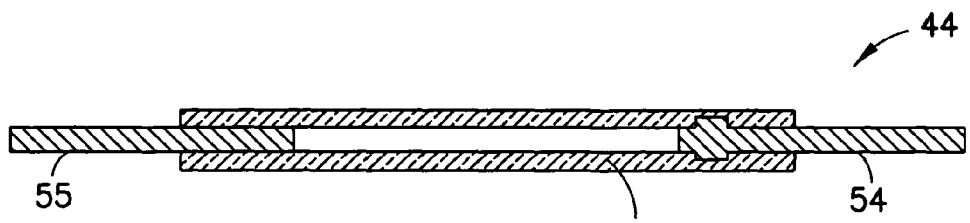
FIG. 7 is a schematic sectional view of the flashlamp shown in FIGS. 4-6.

As seen best in FIG. 7, the flashlamp 44 comprises a hermetically sealed glass envelope. The glass envelope is a thin tube 52 in this example. The tube may be made of fused quartz, borosilicate or Pyrex for example. The tube 52 in this example is straight, but may be bent into a number of different shapes, including helical, "U" shape, and circular (to surround a camera lens for shadowless photography for example). The tube is filled with a noble gas, such as xenon. Xenon is used mostly because of its good efficiency; converting nearly 50% of electrical energy into light. Krypton, on the other hand, is only about 40% efficient. The flashlamp comprises electrodes 54, 55 which extend out of opposite ends of the tube 52. The electrodes are provided to carry electrical current to the gas. The capacitor is used as a high voltage power source to energize the gas when the flashlamp is triggered.

The electrodes 54, 55 protrude into each end of the tube 52, and are sealed to the glass using any suitable method such as, for example, a "ribbon seal" which use thin strips of molybdenum foil bonded directly to the glass, a "solder seal" which bonds the glass to the electrode with a solder, or a "rod seal" where the electrode is wetted with another type of glass and then bonded directly to a quartz tube.

For operation of the flashlamp apparatus 40, the electrodes 54, 55 of the flashlamp 44 are connected to one of the capacitors 38, 39. The controller 20 controls when the capacitor is discharged through the flashlamp. Likewise, the controller controls flow of current through the trigger electrode 46. The capacitor is charged to a relatively high voltage (generally between 250 and 5000 volts). The gas, however, exhibits extremely high resistance, and the lamp will not conduct electricity until the gas is ionized. Once ionized, or "triggered", a spark will form between the electrodes, allowing the capacitor to discharge. The sudden surge of electric current quickly heats the gas to a plasma state, where electrical resistance becomes very low.

In the example shown external triggering is used. The electrodes are charged to a voltage high enough to respond to triggering, but below the lamp's self-flash threshold. An extremely high voltage pulse (the "trigger pulse") is applied directly to, or very near, the glass envelope by the trigger electrode 46. The short, high voltage pulse creates a rising electrostatic field, which ionizes the gas inside the tube 52. The capacitance of the glass couples the trigger pulse into the envelope, where it exceeds the breakdown voltage of the gas surrounding one or both of the electrodes, forming spark streamers. The streamers propagate via capacitance along the glass. If the voltage drop between the cathode and the anode (electrodes 54, 55) is lower than the capacitor voltage, when the internal spark streamers bridge the electrodes the capacitor will discharge through the ionized gas; heating the xenon to a high enough temperature for the emission of light.

In the example shown in these figures, the apparatus comprises the lens member 48. The lens member 48 generally comprises a unitary one-piece member made of transparent material such as glass or polymer material. The lens member 48 performs multiple functions as further understood from the description below. In this example the lens member comprises a main section 56, side mounts and an aperture section 60. The housing 12 of the apparatus 10 has an aperture 62 through its rear side. The aperture section 60 is sized and shaped to fit in the aperture 62. The sides of the aperture section 60 have general angled wedge shapes to allow the aperture section to wedge into the wedge receiving shape of the aperture 62. This wedge shaped fit helps to mount the lens member 48 stationarily to the housing 12. The side mounts 58 also help to stationarily mount the lens member 48 to the housing 12. The front 64 of the lens member 48 forms an exit for light to exit from the flash apparatus in a direction away from the rear side 13 of the apparatus 10.

The main section 56 of the lens member 48 has a longitudinal hole 66 which extends therethrough. The hole 66 is enclosed except at the apertures into the hole at opposite sides of the main section 56 (proximate the side mounts 58). In this example a channel or groove 68 is provided along the hole 66. The groove 68 has the trigger electrode 46 therein. The flashlamp 44 is located in the longitudinal hole 66. The electrodes 54, extend out opposite sides of the hole 66. In this example insulating, sealing material 70 is provided at the opposite sides of the hole 66. The material 70, in addition to insulating the light formation area inside the lens member 48, also helps to stationarily connect the flashlamp inside the hole 66.

The reflector 50 is adapted to reflect light. The reflector 50 is located directly on the exterior side of the lens member 48, but is not located on the front 64. The reflector 50 extends to the end 64 so that substantially all of the light (and perhaps all of the light) cannot exit towards housing 12 or into the housing 12. The features make it possible such that all of the light (or substantially all of the light) is only able to exit from the front 64. The reflector may be, for example, a film of reflective material directly attached to the lens member 48 or reflective paint or an otherwise applied reflector layer directly on the exterior side of the lens member. As seen best in FIG. 6, when the flashlamp generates light L, most of the light passes thought the lens member 48, is reflected by the reflector 50 back through the lens member 48 again, and then exits the front exit side 64 of the lens member 48; in a direction away from the rear side 13 of the housing 12.

As can be seen best in FIGS. 10A-12B, in this example the reflector 50 is provided on all external surfaces of the lens member 48 except at the front face 64 and the side mounts 58. This almost complete covering of the lens member 48 by the reflector 50 significantly reduces scattering light from the flash module. Thus, light output from the front 64 is improved. Also, because the reflector 50 is integral with the lens member 48, assembly of the flash apparatus 40 is easier than in the past. The lens member 48 and reflector 50, because they are integral, form a combined lens/reflector unitary member which also functions as a carrier for the flashlamp 44 and the trigger electrode 46.

Although a xenon flash is superior over a LED flash, a xenon flash in the past suffered a disadvantage because of its relatively larger size. For devices such as mobile devices, the larger size of a xenon flash versus a LED flash was bothersome. Features as described herein may be used to reduce the size of a xenon flash to a smaller size. This may be done by changing the component arrangement versus a convention xenon flash such that the total height 72 (see FIG. 6) is reduced. This may also be done such that the safety distances to other components is minimized by providing the lens around the gas tube instead of on top of reflectors in-between empty space. Advantages of features as described herein include the height 72 being reduced, the safety distances to other components is minimized, and scattering light from the flash module is almost non-existent.

Features as described herein may be used to provide a structure where a lens is in-between the tube of the flashlamp and reflector. Features as described herein may be used to provide lens characteristics (such as diffraction structures and light focusing gratings for example) on the glass surface closest to the reflector. The reflector may also function as a grounding component; connected to ground. This may be used to help reduce the safety distances to minimum, and it also may extend to the farthest end 64 of the lens; closest to the aperture of the flash in the back cover 13, thus reducing the scattering light to a minimum.

In one type of example embodiment a device is constructed of a xenon tube, a lens, a reflector, and electrodes, characterized that the tube is inside the lens, at least some of the light first travels through the lens to the reflector, the light path is corrected before the light hits the reflector, and the light path is also corrected after the light hits the reflector.

In another type of example embodiment a flash device is constructed of a tube, a reflector, and electrodes, characterized in that the electrodes are separated from the reflector to achieve 1. stabile potential in the reflector, and 2. create a Faraday box.

One type of example embodiment may be provided in an apparatus comprising a flashlamp; a lens member connected to the flashlamp; and a reflector connected to the lens member, where the lens member is located between the flashlamp and the reflector.

The flashlamp may comprise a tube, a gas in the tube, electrodes extending out of the tube, and a trigger electrode at an exterior side of the tube, where the trigger electrode is located between the tube and the lens member. The lens member may comprise a grove having the trigger electrode therein. The lens member may substantially entirely surround a tube of the flashlamp. The reflector may be connected to the flashlamp by the lens member. The reflector may be directly attached to an exterior side of the lens member, and where the reflector is not located at an exit side of the lens member. The apparatus may further comprise a sealing material at ends of the flashlamp, where the sealing material is in the lens member. The lens member may comprise a hole therethrough, and where the flashlamp extends into and out of the hole. The lens member may form a transparent reflector carrier, where the reflector is stationarily attached to the flashlamp by the transparent reflector carrier directly between the flashlamp and the reflector, where the transparent reflector carrier spaces the reflector from the flashlamp, and where the reflector is separated from the electrodes. The apparatus may comprise means for connecting the reflector to a housing member when the lens member is connected to the housing member. The flashlamp, the lens member and the reflector may be configured and located relative to each other such that at least some light generated from the flashlamp travels through the lens member before being reflected by the reflector, where the lens member substantially surrounds the flashlamp; and the light, after being reflected by the reflector, travels through the lens member again and out an exit side of the lens member. The lens member may be mounted in an aperture through a housing, where the lens member attaches the flashlamp to the housing. The lens member may attach the reflector to the housing.

An example method may comprise generating light from a flashlamp; the light from the flashlamp traveling through a lens member before being reflected by a reflector, where the lens member substantially surrounds the flashlamp; and the light, after being reflected by the reflector, traveling through the lens member again and out an exit side of the lens member.

Figure 13:
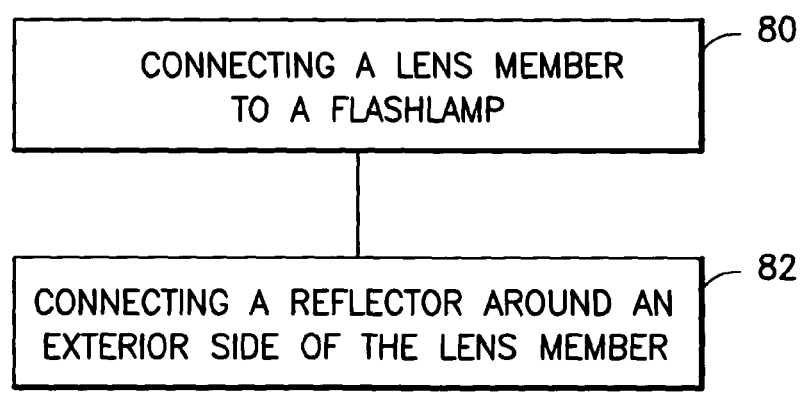
FIG. 13 is diagram illustrating one example method.

Referring also to FIG. 13, an example method may comprise connecting a lens member to a flashlamp as indicated by block 80, where the lens member substantially surrounds the flashlamp, and connecting a reflector around an exterior side of the lens member as indicated by block 82, where an exit side of the lens member is not covered by the reflector. Connecting the lens member to the flashlamp may comprise inserting the flashlamp into a hole in the lens member, where the hole extends into and through the lens member. Connecting the reflector around the exterior side of the lens member may comprise applying a reflector film directly on the exterior side of the lens member. The method may further comprise locating a trigger electrode between a tube of the flashlamp and the lens member. The method may further comprise applying a sealing material at ends of the flashlamp, where the sealing material connects the flashlamp directly in the lens member.

The sealing material and the reflector may cover a trigger electrode of the apparatus to provide a fixed potential at an exterior rim of the apparatus. Thus, the protective distance from the whole Xenon flash component to external components inside the housing 10 may be close to zero. A problem with a conventional xenon solution is that there might be a several kilo volt discharge to an extensive distance from the trigger electrode. Features as described herein help to prevent this. The reflector 50 may be located adjacent, or at least extremely close to, other components of the apparatus 10. The reflector may be connected to ground. Thus, a relatively large amount of space is no longer needed for an air insulator around a xenon flash apparatus as in a conventional device. This helps to make the apparatus 10 smaller, and/or provide more room for other components inside the housing 12.

An example embodiment may be provided in an apparatus comprising a flashlamp having electrodes; and a reflector stationarily attached to the flashlamp by a transparent reflector carrier directly between the flashlamp and the reflector, where the transparent reflector carrier spaces the reflector from the flashlamp, and where the reflector is separated from the electrodes.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
a flashlamp;
a lens member connected to the flashlamp; and
a reflector connected to the lens member,
where the lens member is located between the flashlamp and the reflector, where the flashlamp comprises a tube, a gas in the tube, electrodes extending out of the tube, and a trigger electrode at an exterior side of the tube, and where the trigger electrode is located between the tube and the lens member.

2. An apparatus as in claim 1 where the lens member comprises a grove having the trigger electrode therein.

3. An apparatus as in claim 1 where the lens member substantially entirely surrounds a tube of the flashlamp.

4. An apparatus as in claim 1 where the reflector is connected to the flashlamp by the lens member.

5. An apparatus as in claim 1 where the reflector is directly attached to an exterior side of the lens member, and where the reflector is not located at an exit side of the lens member.

6. An apparatus as in claim 1 further comprising a sealing material at ends of the flashlamp, where the sealing material is in the lens member.

7. An apparatus comprising:
a flashlamp;
a lens member connected to the flashlamp;

a reflector connected to the lens member, where the lens member is located between the flashlamp and the reflector;

a sealing material at ends of the flashlamp, where the sealing material is in the lens member, where the sealing material and the reflector cover a trigger electrode of the apparatus to provide a fixed potential at an exterior.

8. An apparatus as in claim 1 where the lens member comprises a hole therethrough, and where the flashlamp extends into and out of the hole.

9. An apparatus as in claim 1 where the lens member forms a transparent reflector carrier, where the reflector is stationarily attached to the flashlamp by the transparent reflector carrier directly between the flashlamp and the reflector, where the transparent reflector carrier spaces the reflector from the flashlamp, and where the reflector is separated from the electrodes.

10. An apparatus as in claim 1 comprising means for connecting the reflector to a housing member when the lens member is connected to the housing member.

11. An apparatus as in claim 1 where the flashlamp, the lens member and the reflector are configured and located relative to each other such that:

at least some light generated from the flashlamp travels through the lens member before being reflected by the reflector, where the lens member substantially surrounds the flashlamp; and the light, after being reflected by the reflector, travels through the lens member again and out an exit side of the lens member.

12. A device comprising:
a housing;
a camera connected to the housing;
an electronic display connected to the housing;
at least one printed wiring board having a processor connected to the electronic display and the camera;
a memory having software connected to the processor; and
an apparatus as in claim 1 connected to the housing, where the lens member is mounted in an aperture through the housing, and where the lens member attaches the flashlamp to the housing.

13. A device as in claim 12 where the lens member attaches the reflector to the housing.

14. A method comprising:
generating light from a flashlamp comprising a trigger electrode of the flashlamp, adjacent a tube of the flashlamp, triggering the flashlamp, where the trigger electrode is located between a tube of the flashlamp and a lens member connected to the flashlamp;

the light from the flashlamp traveling through the lens member before being reflected by the reflector, where the lens member substantially surrounds the flashlamp; and the light, after being reflected by the reflector, traveling through the lens member again and out an exit side of the lens member.

15. A method comprising:
connecting a lens member to a flashlamp, where the flashlamp comprises a tube and a trigger electrode adjacent the tube, where the lens member substantially surrounds the flashlamp, and where the trigger electrode is located between the tube and the lens member, and connecting a reflector around an exterior side of the lens member, where an exit side of the lens member is not covered by the reflector.

16. A method as in claim 15 where connecting the lens member to the flashlamp comprises inserting the flashlamp into a hole in the lens member, where the hole extends into and through the lens member.

17. A method as in claim 15 where connecting the reflector around the exterior side of the lens member comprises applying a reflector film directly on the exterior side of the lens member.

18. A method as in claim 15 further comprising locating a trigger electrode between a tube of the flashlamp and the lens member.

19. A method as in claim 15 further comprising applying a sealing material at ends of the flashlamp, where the sealing material connects the flashlamp directly in the lens member.

* * * * *